US010273318B2

United States Patent
Hosman et al.

(10) Patent No.: US 10,273,318 B2
(45) Date of Patent: Apr. 30, 2019

(54) PROCESS TO CONTROL OUTPUT AND QUALITY OF ETHYLENE-BASED POLYMER FORMED BY HIGH PRESSURE FREE RADICAL POLYMERIZATION

(71) Applicants: Dow Global Technologies LLC, Midland, MI (US); Dow Brasil Sudeste Industrial Ltda., Sao Paulo/Sp (BR)

(72) Inventors: Cornelis J F Hosman, Ijzendijke (NL); Otto J. Berbee, Hulst (NL); Sergio E. Goncalves, Guaruja (BR); Nhi Dang, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/527,853

(22) PCT Filed: Dec. 18, 2015

(86) PCT No.: PCT/US2015/066860
§ 371 (c)(1),
(2) Date: May 18, 2017

(87) PCT Pub. No.: WO2016/109266
PCT Pub. Date: Jul. 7, 2016

(65) Prior Publication Data
US 2018/0346613 A1 Dec. 6, 2018

Related U.S. Application Data

(60) Provisional application No. 62/097,826, filed on Dec. 30, 2014.

(51) Int. Cl.
*C08F 10/02* (2006.01)
*C08F 2/01* (2006.01)
(Continued)

(52) U.S. Cl.
CPC ............... *C08F 10/02* (2013.01); *C08F 2/01* (2013.01); *C08F 2/34* (2013.01); *Y02P 20/582* (2015.11)

(58) Field of Classification Search
CPC ....... C08F 2/38; C08F 210/16; C08F 2500/08
(Continued)

(56) References Cited

U.S. PATENT DOCUMENTS

| | | |
|---|---|---|
| 4,135,044 A | 1/1979 | Beals |
| 5,844,045 A | 12/1998 | Kolthammer et al. |

(Continued)

FOREIGN PATENT DOCUMENTS

| | | |
|---|---|---|
| EP | 3168237 A1 | 5/2017 |
| EP | 3168238 A1 | 5/2017 |

(Continued)

OTHER PUBLICATIONS

G. Luft, Chem.-Ing.-Tech., Hochdruck-Polyaethylen, vol. 51 (1979) Nr. 10, pp. 960-969.

(Continued)

*Primary Examiner* — Fred M Teskin
(74) *Attorney, Agent, or Firm* — Dinsmore & Shohl LLP

(57) ABSTRACT

The invention provides a process to prepare an ethylene-based polymer, said process comprising polymerizing ethylene in the presence of at least one initiator system selected from the following: a) class 1 initiator system, b) class 2 initiator system, c) class 3 initiator system, or d) a combination thereof; and at a inlet pressure ($P_2$) greater than, or equal to, 1000 Bar (100 MPa); and in a reactor system comprising at least one hyper compressor and a reactor configuration comprising at least one reactor, which comprises at least one reaction zone; and wherein the inlet pressure ($P_2$) is reduced by at least 200 Bar, as compared to (Continued)

a similar polymerization, in the same reactor system, except it is operated at a higher inlet pressure ($P_1$), and at a different hyper compressor throughput, and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D: $0.95*x\hat{}((P_1-P_2)/10 \text{ MPa})<Y<1.04*z\hat{}((P_1-P_2)/10 \text{ MPa})$ (Eqn. D), wherein x is greater than, or equal to, 0.97; and wherein z is less than, or equal to, 1.03. The invention also provides a process to prepare an ethylene-based polymer, said process comprising polymerizing ethylene in the presence of at least one initiator system selected from the following: a) a class 1 initiator system, b) a class 2 initiator system, c) a class 3 initiator system, or d) a combination thereof; and at an inlet pressure ($P_2$) greater than, or equal to, 1000 Bar (100 MPa); and in a reactor system comprising a reactor configuration comprising at least one reactor, which comprises at least one reaction zone; and wherein the inlet pressure ($P_2$) is reduced by at least 200 Bar, as compared to a similar polymerization, in the same reactor configuration, except it is operated at a higher inlet pressure ($P_1$), and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D: $0.95*x\hat{}((P_1-P_2)/10 \text{ MPa})<Y<1.04*z\hat{}((P_1-P_2)/10 \text{ MPa})$ (Eqn. D), wherein x is greater than, or equal to, 0.97; and wherein z is less than, or equal to, 1.03.

15 Claims, 2 Drawing Sheets

(51) Int. Cl.
*C08F 2/34* (2006.01)
*C08F 2/38* (2006.01)

(58) Field of Classification Search
USPC .......................................................... 526/64
See application file for complete search history.

(56) References Cited

U.S. PATENT DOCUMENTS

| | | | |
|---|---|---|---|
| 5,869,575 | A | 2/1999 | Kolthammer et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 7,563,413 | B2 | 7/2009 | Naets et al. |
| 7,582,709 | B2 | 9/2009 | Goossens et al. |
| 7,745,550 | B2 | 6/2010 | Donck et al. |
| 8,273,835 | B2 | 9/2012 | Littmann et al. |
| 8,415,442 | B2 | 4/2013 | Karjala et al. |
| 8,445,606 | B2 | 5/2013 | Lammens et al. |
| 8,822,601 | B2 | 9/2014 | Karjala et al. |
| 8,871,876 | B2 | 10/2014 | Berbee et al. |
| 9,120,880 | B2 | 9/2015 | Zschoch et al. |
| 9,228,036 | B2 | 1/2016 | Berbee et al. |
| 9,234,055 | B2 | 1/2016 | Berbee et al. |
| 9,809,701 | B2 | 11/2017 | den Doelder et al. |
| 9,828,496 | B2 | 11/2017 | den Doelder et al. |
| 2007/0032614 | A1 | 2/2007 | Goossens et al. |
| 2016/0137822 | A1 | 5/2016 | den Doelder et al. |

FOREIGN PATENT DOCUMENTS

| | | |
|---|---|---|
| EP | 3168239 A1 | 5/2017 |
| GB | 1370101 A | 10/1974 |
| WO | 0168723 A2 | 9/2001 |
| WO | 0214379 A1 | 2/2002 |
| WO | 2006094723 A1 | 9/2006 |
| WO | 2012044504 A1 | 4/2012 |
| WO | 2012117039 A1 | 9/2012 |
| WO | 2013059042 A1 | 4/2013 |
| WO | 2014190041 A1 | 11/2014 |
| WO | 2015166297 A1 | 11/2015 |
| WO | 2016/109266 A1 | 7/2016 |
| WO | 2016210235 A1 | 12/2016 |
| WO | 2017058570 A1 | 4/2017 |
| WO | 2017083552 A1 | 5/2017 |
| WO | 2017083559 A1 | 5/2017 |
| WO | 2017083563 A1 | 5/2017 |
| WO | 2017146981 A1 | 8/2017 |
| WO | 2017201110 A1 | 11/2017 |

OTHER PUBLICATIONS

Dow Global Technologies LLC U.S. Appl. No. 62/184,451, filed Jun. 25, 2015.
Dow Global Technologies LLC U.S. Appl. No. 62/233,523, filed Sep. 28, 2015.
PCT/US2015/066860, dated Mar. 29, 2016.
International Search Report and Written Opinion.
Extended European Search Report pertaining to European Patent Application No. 15382554.2 dated May 3, 2016.
International Search Report and Written Opinion pertaining to PCT/US2016/061390 dated Jan. 25, 2017.
Giacomelli et al., "Preliminary Pulsation Analysis for High Pressure Piping Size Evaluation for Hyper-Compressors for LDPE Plants", Proceedings of PVP 2006, Pressure Vessels and Piping, Jul. 23-27, 2006, Vancouver, BC, Canada.
Extended European Search Report pertaining to European Patent Application No. 16382298.4 dated Oct. 24, 2016.
International Search Report and Written Opinion pertaining to PCT/US2017/038771 dated Aug. 24, 2017.
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Ehrlich et al., "Fundamentals of the free radical polymerization of ethylene", Adv. Polymer Sci., vol. 7, 386-448 (1970).
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C.", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.
Maggi et al., "Enhancing the Design of Hyper Compressors and Related LDPE Plants Components", GE Oil & Gas, 2015.
Product Data Sheet Trigonox 145-E85; from AkzoNobel Functional Chemicals; Jan. 2014; 1-3 pages; XL65689.05; www.akzonobel.com/polymer.

PROCESS TO CONTROL OUTPUT AND QUALITY OF ETHYLENE-BASED POLYMER FORMED BY HIGH PRESSURE FREE RADICAL POLYMERIZATION

REFERENCE TO RELATED APPLICATIONS

The present application claims the benefit of U.S. Provisional Application No. 62/097,826, filed Dec. 30, 2014, and incorporated herein by reference.

BACKGROUND

The customer demand in LDPE (low density polyethylene) plastics has rapidly been increased over the time, which has resulted in continuous upscaling of LDPE plant design. The train capacity of the first generation high pressure LDPE trains ranged from 3 to 10 KTA, which was scaled up to 60 to 80 KTA during the 1970's (G. Luft, Chem.-Ing.-Tech., Hochdruck-Polyaethylen, Vol. 51 (1979) Nr. 10, pages 960-969). The train capacity was further raised to 200 KTA in the 1990's, and nowadays the LDPE trains with capacities exceeding 350 KTA are being designed and operated. While in the past a LDPE plant consisted of multiple LDPE reactor trains, for example, four trains of 50 KTA each. Nowadays a LDPE plant can consist of a single 400 KTA train. Larger trains of 600 KTA or more are foreseeable. A LDPE plant with multiple trains is more easily adapted to changing ethylene, power supply and customer demand, while the daily polymer output will be less impacted by reliability issues at a train level. The single large train operation results in lower investment and operation costs; however large swings in daily polymer output, due to reliability issues, places heavier demands on the reliability of ethylene and the power supply.

It is well-known that conventional low density polyethylene (LDPE) is produced with high pressure (for example, 160 MPa to 400 MPa) technology, either in autoclave and/or tube reactors. The initiator systems, known as free-radical agents, are typically injected at multiple points along the reactor, thus creating multiple reaction zones in autoclave and/or tubular reactor systems. The polymerization usually takes place by the feeding of free-radical initiator system at temperatures in the range from 130° C. to 360° C.

It is expected that during normal operation, the train is operated at a preferred set of process conditions, in order to maximize the production rate. However, in some situations, the output of the train has to be reduced (or stopped) due to internal or external problems. Internal train problems could include (temporarily) failures in extrusion, pelletization, compression or pellet transport systems, while external problems could include reduced ethylene supply by problems in the ethylene production, storage or transport systems. Another reason to reduce train output could be a temporarily and/or seasonal lack of demand for LDPE product. Lack of demand could force a plant to go down, from time to time, and to produce and to store product, in advance of a prolonged train stop, in order to secure product supply. This would necessitate investment in storage capability for extended product stock.

Shutting down a high pressure train is not preferred, since it will result in a considerable loss of production during a stop and start-up. Also, additional effort is needed to start up a plant, more off-grade product is produced, and the risk of having process instabilities, such as reactor fouling or even run away reactions (ethylene decomposition), increases.

Publication No. WO 2010/081685 describes a method for reducing the output of a high pressure tubular reactor for the homo- or copolymerization of ethylene, in the presence of free-radical polymerization initiator systems, with at least two initiator injection points, where the feeding of free-radical polymerization initiator system to the first injection point is disconnected, or reduced, to a level, such that the temperature of the reaction mixture in the first reaction zone does not rise more than 20° C. However, a big drawback of the proposed methodology is that polymer properties, for example long chain branching, short chain branching, the molecular weight distribution, as well as density, are not controlled, and will widely vary, which result in production of off-grade product. An off-grade product has at least one significantly property feature outside product specification.

There remains a need for a new polymerization process that can be used to reduce the polymer output at constant product quality, when there is a need to reduce the output of a LDPE train, due to reduced product demand, a reduced supply of a feed stock, or some other restriction(s). There is also an important need for a new process that can produce high pressure ethylene-based polymers, which have maintained polymer properties during the period when output is reduced. These needs have been met by the following invention.

SUMMARY OF THE INVENTION

The invention provides a process to prepare an ethylene-based polymer, said process comprising polymerizing ethylene in the presence of at least one initiator system selected from the following: a) class 1 initiator system, b) class 2 initiator system, c) class 3 initiator system, or d) a combination thereof; and at a inlet pressure ($P_2$) greater than, or equal to, 1000 Bar (100 MPa); and in a reactor system comprising at least one hyper compressor and a reactor configuration comprising at least one reactor, which comprises at least one reaction zone; and wherein the inlet pressure ($P_2$) is reduced by at least 200 Bar, as compared to a similar polymerization, in the same reactor system, except it is operated at a higher inlet pressure ($P_1$), and at a different hyper compressor throughput, and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P_1-P_2)}{10MPa}} < Y < 1.04 * z^{\frac{(P_1-P_2)}{10MPa}}, \quad \text{(Eqn. D)}$$

wherein x is greater than, or equal to, 0.97; and wherein z is less than, or equal to, 1.03.

The invention also provides a process to prepare an ethylene-based polymer, said process comprising polymerizing ethylene in the presence of at least one initiator system selected from the following: a) a class 1 initiator system, b) a class 2 initiator system, c) a class 3 initiator system, or d) a combination thereof; and at an inlet pressure ($P_2$) greater than, or equal to, 1000 Bar (100 MPa); and in a reactor system comprising a reactor configuration comprising at least one reactor, which comprises at least one reaction zone; and wherein the inlet pressure ($P_2$) is reduced by at least 200 Bar, as compared to a similar polymerization, in the same reactor configuration, except it is operated at a higher inlet pressure ($P_1$), and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P1-P2)}{10MPa}} < Y < 1.04 * z^{\frac{(P1-P2)}{10MPa}}, \quad \text{(Eqn. D)}$$

wherein x is greater than, or equal to, 0.97; and wherein z is less than, or equal to, 1.03.

DETAILED DESCRIPTION

Figure 1:
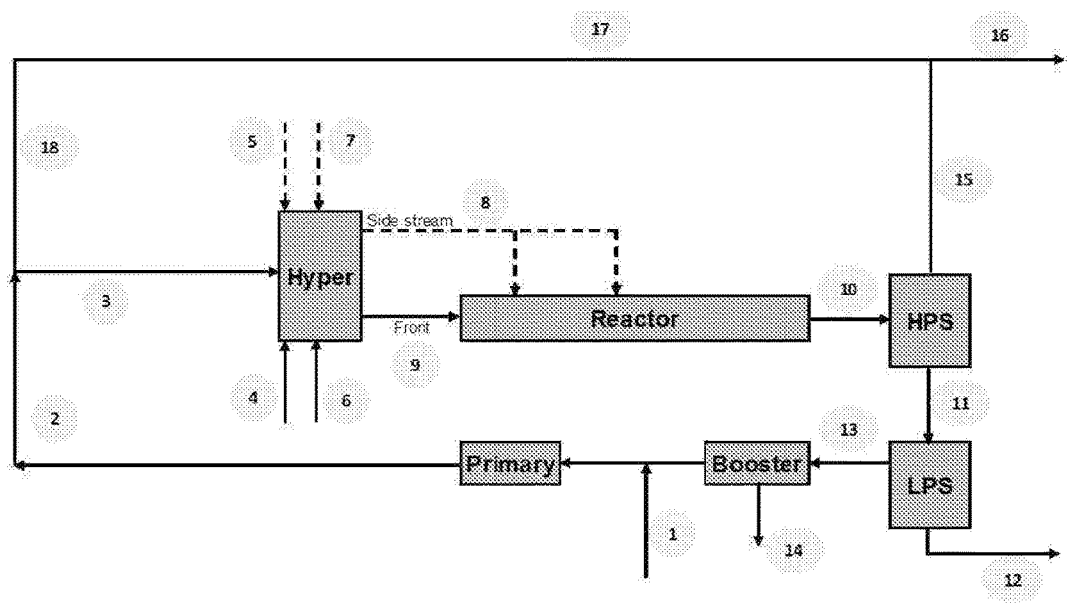
FIG. 1 depicts a polymerization scheme containing a tubular reactor.

It has been discovered that the inventive processes, described herein, can be used to control the output and the quality of ethylene-based polymers, formed by a high pressure, free-radical polymerization. These processes are particularly needed when there is a need to reduce polymer output, due to reduced product demand, reduced supply of one or more feed stocks, or some other restriction(s). As discussed above, the invention provides a process to prepare an ethylene-based polymer, said process comprising polymerizing ethylene in the presence of at least one initiator system selected from the following: a) class 1 initiator system, b) class 2 initiator system, c) class 3 initiator system, or d) a combination thereof; and at a inlet pressure ($P_2$) greater than, or equal to, 1000 Bar (100 MPa); and in a reactor system comprising at least one hyper compressor and a reactor configuration comprising at least one reactor, which comprises at least one reaction zone; and wherein the inlet pressure ($P_2$) is reduced by at least 200 Bar, as compared to a similar polymerization, in the same reactor system, except it is operated at a higher inlet pressure ($P_1$), and at a different hyper compressor throughput, and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P1-P2)}{10MPa}} < Y < 1.04 * z^{\frac{(P1-P2)}{10MPa}}, \quad \text{(Eqn. D)}$$

wherein x is greater than, or equal to, 0.97; and wherein z is less than, or equal to, 1.03.

The invention also provides a process to prepare an ethylene-based polymer, said process comprising polymerizing ethylene in the presence of at least one initiator system selected from the following: a) a class 1 initiator system, b) a class 2 initiator system, c) a class 3 initiator system, or d) a combination thereof; and at an inlet pressure ($P_2$) greater than, or equal to, 1000 Bar (100 MPa); and in a reactor system comprising a reactor configuration comprising at least one reactor, which comprises at least one reaction zone; and wherein the inlet pressure ($P_2$) is reduced by at least 200 Bar, as compared to a similar polymerization, in the same reactor configuration, except it is operated at a higher inlet pressure ($P_1$), and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P1-P2)}{10MPa}} < Y < 1.04 * z^{\frac{(P1-P2)}{10MPa}}, \quad \text{(Eqn. D)}$$

wherein x is greater than, or equal to, 0.97; and wherein z is less than, or equal to, 1.03.

An inventive process may comprise a combination of two or more embodiments described herein.

The following embodiments apply to each inventive process described above.

In one embodiment, $P_1 > P_2$.

In one embodiment, the "Ratio of high temperature peroxide per reaction zone (Qi)" meets the following Equation B:

$$0.90 * a^{\frac{(P1-P2)}{10MPa}} < Qi < 1.1 * b^{\frac{(P1-P2)}{10MPa}}, \quad \text{(Eqn. B)}$$

wherein a is greater than, or equal to, 0.96, and b is less than, or equal to, 1.04.

In one embodiment, the reactor configuration comprises at least one tubular reactor, at least one autoclave reactor, or a tubular reactor followed by an autoclave reactor.

In one embodiment, the ethylene-based polymer is a low density polyethylene (LDPE).

In one embodiment, the ethylene-based polymer is an ethylene-based interpolymer.

In one embodiment, the ethylene-based polymer is an ethylene-based copolymer.

In one embodiment, the ethylene-based polymer has a melt index (I2) from 0.1 to 100 g/10 min. In a further embodiment, the ethylene-based polymer has a melt index (I2) from 0.15 to 80 g/10 min, further from 0.2 to 60 g/10 min.

An inventive ethylene-based polymer may comprise a combination of two or more embodiments as described herein.

An inventive composition may comprise a combination of two or more embodiments as described herein.

An inventive article may comprise a combination of two or more embodiments as described herein.

An inventive process may comprise a combination of two or more embodiments as described herein.

Process

For producing a highly branched ethylene-based polymer, a high pressure free-radical initiated polymerization process is typically used. Two different high pressure free-radical initiated polymerization reactor types are known. In the first type, an agitated autoclave vessel having one or more reaction zones is used. Suitable, but not limiting, the autoclave reactor can have dimensions with an internal diameter varying from 0.1 to 1 m and a L/D ratio varying from 1 to 20. The autoclave reactor normally has several injection points for initiator and/or monomer feeds. In the second type, a jacketed tube having one or more reaction zones is used as a reactor. Suitable, but not limiting, reactor lengths may be from 100 to 4000 meters (m), or from 500 to 3500 m. The pressure level in a high pressure reactor is controlled by a control valve (letdown valve) in the outlet of the reactor. It is typical for a tubular reactor to use a periodic pressure pulsation or bump, in order to remove or reduce wall layer by a temporarily increase in process velocity.

The beginning of a reaction zone, for either type of reactor, is typically defined by the side injection of initiator of the reaction, ethylene, CTA (or telomer), or comonomer(s), and any combination thereof. A high pressure process can be carried out in autoclave or tubular reactors having one or more reaction zones, or in a combination of autoclave and tubular reactors, each comprising one or more reaction zones.

A high pressure polymerization process makes use of various compression devices to pressurize and feed the ethylene-based recycle and ethylene-based feed streams, including the following: a Booster compressor (Booster), a Primary compressor (Primary), and a Hyper compressor (Hyper) or Secondary compressor.

The ratio from discharge pressure to suction pressure determines the number of compressor stages used. The gas discharge temperature is one of the limiting factors determining the stage pressure ratio. In addition, the maximum allowed discharge temperatures are a function the acceptable operating temperatures of sealing material used, including piston rings, rod rings, o-rings and gaskets. Also a high suction temperature will decrease compression horse power (Compressor handbook, Hanlon 2001). And the higher suction temperature will decrease the density of ethylene, resulting into lower ethylene throughput (ASPEN and PC SAFT computations). The combination of lower suction pressure and higher suction temperature will be very effective to reduce ethylene throughput, while maintaining the compression ratio, and not exceeding the motor load and mechanical loading constraints.

In one embodiment, the reactor system comprises a hyper compressor. In one embodiment, the through-put rate of the hyper compressor is greater than, or equal to, 30 metric tons per hour, further greater than, or equal to, 50 metric tons per hour, further greater than, or equal to, 70 metric tons per hour, further greater than, or equal to, 100 metric tons per hour≥100. In one embodiment, the through-put rate of the hyper compressor is from 30 to 400 metric tons per hour. In one embodiment, the capacity of the hyper compressor is from 40,000 kg/hr to 400,000 kg/hr. In one embodiment, the maximal discharge pressure of the hyper compressor is from 150 MPa to 450 MPa.

In one embodiment, the reactor system comprises a primary compressor. In one embodiment, the through-put rate of the primary compressor is from 10 to 150 metric tons per hour.

In one embodiment, the inventive process takes place in a reactor configuration that comprises at least one tubular reactor, at least one autoclave reactor, a tubular reactor followed by an autoclave reactor, or an autoclave reactor followed by a tubular reactor.

In an embodiment, the inventive process takes place in a reactor configuration that comprises at least one autoclave and/or tubular reactor.

In one embodiment, the inventive process takes place in a reactor configuration that comprises a tubular reactor.

In one embodiment, the inventive process takes place in a reactor configuration that comprises a tubular reactor and an autoclave reactor. In a further embodiment, the tubular reactor is downstream from the autoclave reactor.

In one embodiment, the inlet pressure ($P_2$) is greater than, or equal to, 1100 Bar (110 MPa). In a further embodiment, the inlet pressure ($P_2$) is greater than 1100 Bar (110 MPa).

In one embodiment, inlet pressure ($P_2$) is greater than, or equal to, 1200 Bar (120 MPa). In a further embodiment, the inlet pressure ($P_2$) is greater than 1200 Bar (120 MPa), further greater than 1250 Bar (125 MPa), further greater than 1300 Bar (130 MPa).

In one embodiment, the hyper compressor inlet pressure is reduced by more than 10 Bar, as compared to the hyper compressor inlet pressure of the similar polymerization.

In one embodiment, the hyper compressor inlet pressure is reduced by more than 20 Bar, as compared to the hyper compressor inlet pressure of the similar polymerization.

In one embodiment, the hyper compressor inlet pressure is reduced by more than 30 Bar, as compared to the hyper compressor inlet pressure of the similar polymerization.

In one embodiment, the hyper compressor inlet pressure is reduced by more than or 40 Bar, as compared to the hyper compressor inlet pressure of the similar polymerization.

In one embodiment the hyper compressor inlet pressure is reduced by more than 50 Bar, as compared to the hyper compressor inlet pressure of the similar polymerization.

In one embodiment the hyper compressor inlet pressure is reduced by more than 60 Bar, as compared to the hyper compressor inlet pressure of the similar polymerization.

In one embodiment the hyper compressor inlet pressure is reduced by more than 70 Bar, as compared to the hyper compressor inlet pressure of the similar polymerization.

In one embodiment the hyper compressor inlet pressure is reduced by more than 80 Bar, as compared to the hyper compressor inlet pressure of the similar polymerization.

In one embodiment the hyper compressor inlet pressure is reduced by more than 90 Bar, as compared to the hyper compressor inlet pressure of the similar polymerization.

In one embodiment the hyper compressor inlet pressure is reduced by more than 100 Bar, as compared to the hyper compressor inlet pressure of the similar polymerization.

In one embodiment the reactor inlet pressure ($P_2$) is reduced by at least 100 Bar.

In one embodiment the reactor inlet pressure ($P_2$) is reduced by at least 150 Bar. In one embodiment the reactor inlet pressure ($P_2$) is reduced by at least 200 Bar.

In one embodiment the reactor inlet pressure ($P_2$) is reduced by at least 250 Bar.

In one embodiment the reactor inlet pressure ($P_2$) is reduced by at least 300 Bar.

In one embodiment the reactor inlet pressure ($P_2$) is reduced by at least 350 Bar.

In one embodiment the reactor inlet pressure ($P_2$) is reduced by at least 400 Bar.

In one embodiment the reactor inlet pressure ($P_2$) is reduced by at least 500 Bar.

In one embodiment, the inventive process further comprises a depressurization step, or so-called bump, that is repeated at least twice, and wherein the depressurization step comprises enlarging the opening of a pressure control valve, and then reducing the opening to its position used during the original polymerization conditions, and wherein the pressure control valve is located at the end of a reactor of the reactor configuration. Typically the depressurization step, performed using the pressure control valve, occurs within 0.5 to 2 seconds. The bump is applied to improve heat transfer in the reactor, and to remove polymer build-up or fouling build-up at the reactor wall. The bump is applied to improve heat transfer in the reactor and to remove polymer or fouling build-up at the reactor wall.

In one embodiment, the depressurization step is performed at least once, at a time interval from 10 seconds to 10 minutes of polymerization; thus, within each time interval (10 sec-10 minutes) at least one depressurization step takes place. In a further embodiment, the time interval is preferably less than 5 minutes, more preferably less than 3 minutes, and most preferably less than 2 minutes. In another embodiment, the time interval is preferably greater than, or equal to 10 seconds, more preferably greater than, or equal to 30 seconds, and most preferably greater than, or equal to 1 minute.

In one embodiment, the depressurization step is completed within 10 seconds, more preferably within 6 seconds, and most preferably within 4 seconds.

In one embodiment, the depressurization step is completed within 5 seconds, more preferably within 3 seconds, and most preferably within 1.5 seconds.

In one embodiment, the depressurization step is completed within 2 seconds, more preferably within 1 second, and most preferably within 0.5 second.

In one embodiment, the depressurization step causes the reactor inlet pressure to temporarily decrease by at least 30 bar, further by at least 50 bar, further by at least 60 bar, and further by at least 80 bar.

In one embodiment, the depressurization step causes the reactor inlet pressure to temporarily decrease by at least 100 bar, further by at least 120 bar, further by at least 150 bar, and further by at least 200 bar.

In one embodiment, the inventive process is operated without a depressurization step.

In one embodiment, the hyper compressor inlet pressure is reduced by more than 100 Bar, as compared to the hyper compressor inlet pressure of the similar polymerization, while the hyper compressor inlet temperature is increased by more than 5° C., as compared to the hyper compressor inlet temperature of the similar polymerization.

In one embodiment, the hyper compressor inlet pressure is reduced by more than 30 Bar, as compared to the hyper compressor inlet pressure of the similar polymerization, while hyper compressor inlet temperature is increased by more than 5° C., as compared to the hyper compressor inlet temperature of the similar polymerization.

In one embodiment, the hyper compressor inlet pressure is reduced by more than 50 Bar, as compared to the hyper compressor inlet pressure of the similar polymerization, while the hyper compressor inlet temperature is increased by more than 5° C., as compared to the hyper compressor inlet pressure of the similar polymerization.

In one embodiment, the hyper compressor inlet pressure is reduced by more than 70 Bar, as compared to the hyper compressor inlet pressure of the similar polymerization, while the hyper compressor inlet temperature is increased by more than 5° C., as compared to the hyper compressor inlet temperature of the similar polymerization.

In one embodiment, the hyper compressor inlet pressure is reduced by more than 40 Bar, as compared to the hyper compressor inlet pressure of the similar polymerization, while the hyper compressor inlet temperature is increased by more than 10° C., as compared to the hyper compressor inlet temperature of the similar polymerization.

In one embodiment, the hyper compressor inlet pressure is reduced by more than 60 Bar, as compared to the hyper compressor inlet pressure of the similar polymerization, while the hyper compressor inlet temperature is increased by more than 10° C., as compared to the hyper compressor inlet temperature of the similar polymerization.

In one embodiment, the hyper compressor inlet pressure is reduced by more than 80 Bar, as compared to the hyper compressor inlet pressure of the similar polymerization, while the hyper compressor inlet temperature is increased by more than 10° C., as compared to the hyper compressor inlet temperature of the similar polymerization.

In one embodiment, the hyper compressor inlet pressure is reduced by more than 40 Bar, as compared to the hyper compressor inlet pressure of the similar polymerization, while the hyper compressor inlet temperature is increased by more than 15° C., as compared to the hyper compressor inlet temperature of the similar polymerization.

In one embodiment, the hyper compressor inlet pressure is reduced by more than 60 Bar, as compared to the hyper compressor inlet pressure of the similar polymerization, while the hyper compressor inlet temperature is increased by more than 15° C., as compared to the hyper compressor inlet temperature of the similar polymerization.

In one embodiment, the hyper compressor inlet pressure is reduced by more than 80 Bar, as compared to the hyper compressor inlet pressure of the similar polymerization, while the hyper compressor inlet temperature is increased by more than 15° C., as compared to the hyper compressor inlet temperature of the similar polymerization.

Often a CTA is used to control molecular weight. In one embodiment, one or more CTAs are added to an inventive polymerization process. CTAs typically comprise at least one of the following groups: alkanes, aldehydes, ketones, alcohol, ether, esters, mercaptan or phosphine. In a further embodiment, a CTA comprises at least a group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, ISOPAR-C, -E, and -H (ExxonMobil Chemical Co.), and isopropanol. In one embodiment, the amount of CTA used is from 0.03 to 10 weight percent based on the weight of the total reaction mixture.

In one embodiment, in which CTA is added to the polymerization (inventive process), the ratio of the concentration of the CTA in the feed to reaction zone i, wherein i≥2, and reaction zone i is downstream from reaction zone 1, to the concentration of the CTA in the feed to reaction zone 1, is greater than, or equal to, 1.0, or greater than 1.5, or greater than 2.0. In a further embodiment, the concentration of the CTA in the feed to reaction zone 1, is greater than 1.0, or greater than 1.5, or greater than 2.0.

In one embodiment, in which CTA is added to the polymerization (inventive process), the ratio of the concentration of the CTA in the feed to reaction zone i, wherein i≥2, and reaction zone i is downstream from reaction zone 1, to the concentration of the CTA in the feed to reaction zone 1, is less than 1.0, or less than 0.8, or less than 0.6, or less than 0.4.

In one embodiment, the process includes a high pressure and low pressure recycle loop to improve ethylene efficiency, since ethylene is only partially converted or consumed per reactor pass. Typically, the conversion level per reactor pass is from 10% to 40%, with conversion levels for tubular reactors being at the higher end of that range, and conversion levels for autoclave reactors being at the lower end of that range.

In one embodiment, the polymerization takes place in a tubular reactor, as described in international patent publication WO 2013/059042. This patent publication uses a multi-zone reactor and describes alternative locations of feeding fresh ethylene to control the ethylene to CTA ratio, and therefore polymer properties. Fresh ethylene may be simultaneously added in multiple locations, to achieve the desired ethylene to CTA ratio. In a similar way, addition of fresh CTA addition points may carefully be selected to control polymer properties, as described in international patent publication WO 2013/078018. Fresh CTA may be simultaneously added in multiple locations, to achieve the desired CTA to ethylene ratio.

In one embodiment, the polymerization takes place in an autoclave reactor.

In one embodiment, the polymerization takes place in a combined autoclave and tubular reactor. In one embodiment, the polymerization takes place in a tubular reactor. In one embodiment, the polymerization takes place in a reactor system consisting of multiple parallel reactors of autoclave, autoclave-tubular and/or tubular nature. In one embodiment, the polymerization takes place in two reactors.

In one embodiment, the polymerization takes place in one reactor with multiple, or at least two, reaction zones.

In one embodiment, the polymerization takes place in a reactor configuration comprising at least two reaction zones, reaction zone 1 and reaction zone i (i≥2) and wherein reaction zone i is downstream from reaction zone 1. In an embodiment, i is from 2 to 5, or from 2 to 6, or from 2 to 7, or from 2 to 8. In one embodiment, i=2.

In one embodiment, ethylene is fed to the first reaction zone, and wherein the ethylene fed to the first reaction zone, is at least 10 percent of the total ethylene fed to the polymerization. In one embodiment, the ethylene fed to the first reaction zone is from 10 to 100 percent, or from 20 to 80 percent, or from 25 to 75 percent, or from 30 to 70 percent, or from 40 to 60 percent of the total ethylene fed to the polymerization.

In one embodiment, the number of ethylene based feed streams to the reactor system is from 1 to 8, or from 1 to 6, or from 1 to 4, or from 1 to 3, or from 1 to 2, or 1 only.

In one embodiment, the number of ethylene-based feed streams to a reactor in the reactor system is from 1 to 6, or from 1 to 5, or from 1 to 4, or from 1 to 3, or from 1 to 2, or 1 only.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

Free radical initiator systems are generally used to produce the inventive ethylene-based polymers. A free radical initiator system, as used here, refers to a free radical generated by chemical and/or radiation means. Exemplary free radical initiator systems include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiator systems are t-butyl peroxy pivalate, di-t-butyl peroxide, t-butyl peroxy acetate and t-butyl peroxy-2-hexanoate, or mixtures thereof. Furthermore oxygen can be used as an initiator. In one embodiment, these organic peroxide initiators are used in an amount from 0.001-0.2 wt %, based upon the weight of polymerizable monomers.

Peroxide initiators can be characterized and classified with their respective half life temperature at certain time intervals. For instance, the half life temperature at 0.1 h indicates the temperature at which 50 mole % of the initiator is dissociated into radicals (in 0.1 h (or 6 minutes)) at atmospheric pressure.

AkzoNobel show in their brochure ("Initiators for High Polymers," June 2006) half life temperatures at 0.1, 1.0 and 10 h (at atmospheric pressure) for their commercial organic peroxide initiators. Due to typical residence times of less than five minutes, in a high pressure reactor system, and less than two minutes in the individual reactor zones, the "half life temperature at 0.1 hr" is relevant for the classification and selection of organic peroxide initiators. The Organic peroxides can be classified in the following classes (at atmospheric pressure):

Class 1: Low temperature initiator system, with half life temperature at 0.1 hour, from 70 to 120° C. For example, a low temperature peroxide system. These peroxides are typically used to start a polymerization. Some examples of class 1 initiators are shown in Table A below.

Class 2: Medium temperature initiator system, with half life temperature at 0.1 hour, from 120 to 150° C. For example, a medium temperature peroxide system. Some examples of class 2 initiators are shown in Table A below.

Class 3: High temperature initiator system, with half life temperature at 0.1 hour, above 150° C. For example, a high temperature peroxide system. Some examples of class 3 initiators are shown in Table A below.

Examples of some peroxides are listed in Table A below.

TABLE A

| Class | Initiator system | Chemical name | Half-life temperature [° C.] | | |
|---|---|---|---|---|---|
| | | | 0.1 [hr] | 1 [hr] | 10 [hr] |
| Class 1 | TRIGONOX 25 (TBPIV) | Tert-Butyl peroxypivalate | 94 | 75 | 57 |
| | TRIGONOX 21 (TBPO) | Tert-Butyl peroxy-2-ethylhexanoate | 113 | 91 | 72 |

TABLE A-continued

| | | | Half-life temperature [° C.] | | |
|---|---|---|---|---|---|
| Class | Initiator system | Chemical name | 0.1 [hr] | 1 [hr] | 10 [hr] |
| Class 2 | TRIGONOX F (TPA) | Tert-Butyl peroxyacetate | 139 | 119 | 100 |
| | TRIGONOX 201 | Di-tert-amyl peroxide | 150 | 128 | 108 |
| Class 3 | TRIGONOX 101 | 2,5-Dimethyl-2,5-di(tert-butylperoxyl)hexane | 156 | 134 | 115 |
| | TRIGONOX T | Tert-Butyl cumyl peroxide | 159 | 136 | 115 |
| | TRIGONOX B (DTBP) | Di-tert-butyl peroxide | 164 | 141 | 121 |
| | TRIGONOX 145-E85 | 2,5-Dimethyl-2,5-di(tert-butylperoxy)hexyne-3 | 164 | 141 | 120 |

Oxygen is thought to work through formation of intermediate organic hydroperoxides, which will typically decompose at temperatures starting at 180° C., therefore oxygen can be considered a high temperature initiator (Class 3).

Organic peroxides are often applied in mixtures of lower and higher temperature initiator systems, in order to start and/or accelerate temperature development by the lowest temperature initiator class, while the control temperature, respectively maximum zone temperature for autoclave reaction zone and maximum peak temperature for tubular reactor zone, is controlled, and determined by, the highest temperature initiator class.

The temperature control of a reaction zone is therefore a function of the molar sum of initiators of the highest temperature class, fed into each zone, and can be further affected by the efficiency, in which the applied higher temperature peroxides will dissociate into and/or generate polymerization radicals.

The mixture of single or multiple initiators, potentially diluted with a solvent, injected into a reaction zone i, is called initiation system for reaction zone i.

In one embodiment, oxygen is used alone, or in combination with other initiators for example class 1, class 2 and/or class 3 initiator.

In one embodiment the initiator usage and efficiency are affected by the so-called cage-in effect or potential, to form effective polymerization radicals (see References).

In one embodiment, an initiator is added to at least one reaction zone, and the initiator has a half-life temperature, at one second, greater than 255° C., preferably greater than 260° C. In a further embodiment, such initiators are used at a peak polymerization temperature from 320° C. to 350° C. In a further embodiment, the initiator system comprises at least one peroxide group incorporated in a ring structure. Examples of such initiators include, but are not limited to, TRIGONOX 301 (3,6,9-triethyl-3,6,9-trimethyl-1,4,7-triperoxonaan; Class 3) and TRIGONOX 311 (3,3,5,7,7-pentamethyl-1,2,4-trioxepane; Class 3), both available from Akzo Nobel, and HMCH-4-AL (3,3,6,6,9,9-hexamethyl-1,2,4,5-tetroxonane; Class 3) available from United Initiators. See also International Publication Nos. WO 02/14379 and WO 01/68723.

In one embodiment, the at least one initiator system comprises a peroxide.

In one embodiment, the at least one initiator system comprises an initiator selected from the following: tert-butyl peroxypivalate, tert-butyl peroxy-2-ethylhexanoate, tert-butyl peroxyacetate, di-tert-amyl peroxide, 2,5-dimethyl-2,5-di(tert-butylperoxyl)hexane, tert-butyl cumyl peroxide, di-tert-butyl peroxide, or 2,5-Dimethyl-2,5-di(tert-butylperoxy)hexyne-3.

In one embodiment, the at least one initiator system comprises an initiator selected from the following: tert-butyl peroxypivalate, tert-butyl peroxy-2-ethylhexanoate, tert-butyl peroxyacetate, di-tert-amyl peroxide, 2,5-dimethyl-2,5-di(tert-butylperoxyl)hexane, tert-butyl cumyl peroxide, or di-tert-butyl peroxide.

In one embodiment, the polymerization pressure, as measured at the first inlet of the reactor, is from 1000 Bar to 4000 Bar, or from 1400 to 3600 Bar, or from 1800 to 3200 Bar.

Depending on the final article processing step and the end-usage, different product quality targets are set for each product grade. Melt-index, density and melt elasticity are the main parameters to describe, and to measure, the product quality, and the consistency of the produced product. Melt index reflects the average molecular weight, and can be adjusted/controlled through varying the level and contribution of CTA systems. The short chain branching (SCB) level is an indicator for product density, which density is typically controlled to fall within certain ranges, for instance 0.922±0.002 g/cc. The long chain branching (LCB) level strongly affects the molecular weight distribution, and consequently the visco-elastic properties, for instance melt strength, and is important in applications, such as blown and cast film, foam, extrusion coating etc. For LCB level, only small variations are allowed (for instance ±5% versus reference) for the production of the individual grades. The individual grades may require different target LCB levels, depending on melt elasticity level needed in the final product application. Larger deviations from target LCB level will result in product with strong deviations in processing and optical appearance (for instance gloss and haze), and therefore, product produced with these larger deviations will be classified as off-specification or off-grade. Properties like SCB and LCB levels are strongly affected by the applied polymerization temperature and pressure levels. Additionally the LCB level is also affected by the polymer level profile in the reactor system.

In one embodiment, the simulated LCB level for each grade of the ethylene-based polymer is allowed to vary less than ±10.0% from product grade target level. In one embodiment, the simulated LCB level for each grade of the ethylene-based polymer is allowed to vary less than ±8.0% from product grade target level. In one embodiment, the simulated LCB level for each grade of the ethylene-based polymer is allowed to vary less than ±6.5% from product grade target level. In one embodiment, the simulated LCB level for each grade of the ethylene-based polymer is allowed to vary less than ±5.0% from product grade target level. In one embodiment, the simulated LCB level for each grade of the ethylene-based polymer is allowed to vary less than ±4.0% from product grade target level.

In one embodiment, the simulated SCB level for each grade of the ethylene-based polymer is allowed to vary less than 10.0% from product grade target level. In one embodiment, the simulated SCB level for each grade of the ethylene-based polymer is allowed to vary less than 8.0% from product grade target level. In one embodiment, the simulated SCB level for each grade of the ethylene-based polymer is allowed to vary less than 6.0% from product grade target level. In one embodiment, the simulated SCB level for each grade of the ethylene-based polymer is allowed to vary less than ±4.0% from product grade target level.

In one embodiment, the total ethylene based feed flow to the reactor configuration is from 20 to 400 tons per hour, or from 40 to 300 tons per hour, or from 50 to 250 tons per hour, or from 80 to 240 tons per hour, or from 100 to 220 tons per hour.

In one embodiment, the maximum polymer production rate is from 10 to 125 tons per hr, or from 20 to 100 tons per hour, or from 40 to 100 tons per hour.

An inventive process may comprise a combination of two or more embodiments described herein.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers, polymer blends and compositions of this invention may be employed in a variety of conventional thermoplastic fabrication processes to produce useful articles, including extrusion coating onto various substrates (for example, paper, cardboard, or a metal); monolayer and multilayer films; molded articles, such as blow molded, injection molded, or roto molded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper back sheets.

Other suitable applications include, but are not limited to, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the copolymer, and a comonomer as the only monomer types.

The terms "ethylene feed stream" or "ethylene based feed" or "ethylene based feed stream," or "ethylene feed," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent etc) and/or impurities (as for instance initiator degradation products) may be present in the feed stream.

The term "high pressure polymerization process," as used herein, refers to a free radical polymerization process carried out at an elevated pressure of at least 1000 Bar (100 MPa).

The terms "side stream" or "side feed stream," as used herein, refer to the ethylene-rich feed stream, CTA system feed stream, and/or initiator system, to sequential reaction zones.

The term "reactor system," as used herein, refers to the devices used to polymerize and isolate a polymer. Such devices include, but are not limited to, one or more reactors, reactor pre-heater(s), monomer-reactor cooling device(s), Hyper-compressor(s), Primary compressor(s), and/or Booster compressor(s).

The term "reactor configuration," as used herein, refers one or more reactors, and optionally one or more reactor pre-heaters, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the reactor configuration.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of fresh ethylene, and free radicals or components which dissociate into and/or generate free radicals.

The term "first reaction zone," as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, fresh, recycled ethylene and/or comonomer(s).

The phrase "maximum temperature for a reaction zone," as used herein, refers to the highest temperature measured in a reaction zone, for example, in an autoclave reaction zone (typically, noted as a maximum zone temperature), and a tubular reaction zone (typically noted as a peak temperature).

Hyper compressor (or secondary compressor), is a device that compresses a feed stream; for example, at least one of the following: a) the ethylene-based components coming from the HPR (High Pressure Recycle), and/or b) the ethylene-based components, each coming from the Primary, each to a pressure level required to feed the reactor at its inlet pressure. This compression can take place in one or multiple compression stages, and can be combined with intermediate cooling. The Hyper comprises a reciprocating plunger compressor, and can consist of single or multiple compressor frame(s).

The term "hyper compressor throughput," as used herein, refers to the net amount of feed components, for example, ethylene-based feed components, compressed and fed to the reactor configuration. The secondary throughput is a function of the compression volume and the density of the feed components, for example, ethylene based components, at the suction side. The pressure and temperature conditions at the suction side of the secondary compressor will define the density of the feed components, for example, ethylene based components, to be compressed. The through-put for a hyper compressor may range from 30 to 400 metric tons per hour.

The term "hyper compressor inlet pressure," as used herein, refers to the pressure at the suction side of the hyper compressor system.

The term "hyper compressor inlet temperature," as used herein, refers to the temperature at the suction side of the hyper compressor system.

The term "ethylene-based feed components," are used herein refer to ethylene (fresh and/or recycled), and optionally CTA (fresh and/or recycled), solvent (fresh and/or recycled), comonomer(s) (fresh and/or recycled) and/or other components (for example, including, but not limited to, fresh and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane and/or initiator dissociation products. In another embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane, initiators (for example, oxygen) and/or initiator dissociation products.

The term "fresh," when used herein, in reference to an ethylene-based feed component (i.e., "fresh ethylene," "fresh CTA"), refers to reactant provided from an external source(s), and not provided internally from a recycled source(s). For example, in an embodiment, fresh ethylene is used as "make-up ethylene" required to compensate for the ethylene consumed by the polymerization and/or lost through, for example, ethylene purge from the process and residual ethylene in the polymer.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The terms "feed," "feed flow," or "feed stream," as used herein, refer to fresh and/or recycled components (for example, ethylene, initiator, CTA, and/or solvent) added to a reaction zone at an inlet.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer.

The term "initiator system" includes a single initiator, or a mixture of initiators, each typically dissolved in a solvent (for example, a hydrocarbon solvent) added to the polymerization process.

The term "injection point," as used herein, refers to the inlet location of a device (used in a polymerization process) where a feed stream is added into the device.

The term "feed conditions", as used herein, refers to the flows in moles of the components fed to the reactor, for instance ethylene, CTA, initiators and/or co-monomer(s).

The term "reactor length", as use herein, refers to the length of the reactor, including the preheated part, multiple reaction zones and cooling down polymerization before the pressure letdown.

The product properties or quality of a product resin (for example, LDPE) is determined by the reactor design, the feed conditions and the reactor operating conditions such as inlet pressure and temperature conditions in the individual reaction zones.

Typically for each product resin (for example, LDPE) a product recipe is developed in order to produce this resin at optimized process conditions and output, while meeting the target product quality ranges.

Typically each resin is produced at the product recipe values, while melt-index is controlled with the CTA feed flow and the Molecular Weight Distribution (MWD) and/or rheological properties are controlled by fine-tuning temperature set point conditions of the reactor system.

The term "product specification," as used herein, refers to the required ranges and level of the basic product properties such as, for instance Melt Index, density, MWD and/or rheological properties. The product is prime saleable product when it is produced and analyzed within the required ranges of the specified basic product properties.

The term "compression ratio," as used herein, refers to the ratio between discharge and suction pressures of a compression step and/or a compressor.

The term "motor load", as used herein, refers to the energy required by the compressor to compress ethylene-based feed flow from suction to discharge conditions.

The term "turn down ratio," as used herein, refers to the ratio between the polymer output (reduced) versus the polymer output at standard operation conditions. The turn down ratio, or polymer output reduction, as discussed in the experimental section, is determined by the ratio between the polymer output of each case (or polymerization) and the polymer output of a "baseline" case (or polymerization).

The term "standard operation conditions," as used herein, refers to the process conditions to make the individual product grade at target output and target product properties.

The terms "CTA activity" or "chain transfer activity coefficient (Cs value)" as used herein, refer to the ratio between the "rate of chain transfer" to the "rate of ethylene propagation." See Mortimer references provided below.

The Booster compressor (Booster) is a device that compresses the following: a) the low pressure recycle coming from the LPS (Low pressure Separator), and b) optionally, the recycled compressor packing leaks, each to the pressure level required at the inlet side of the Primary compressor. This compression can take place in one or multiple compression stages, and can be combined with intermediate cooling. A Booster can consist of single or multiple compressor frames, and can be potentially combined with Primary compressor frame(s).

The Primary compressor (Primary) is a device that compresses the following: a) the fresh incoming ethylene, and/or b) the low pressure recycle coming from the Booster, and/or c) the recycled compressor packing leaks, each to the pressure level required at the inlet side of the Hyper compressor. This compression can take place in one or multiple compression stages, and can be combined with intermediate cooling. The Primary can consist of single or multiple compressor frames, and can be potentially combined with Booster compressor frame(s).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

The term "long chain branching frequency (LCBf)" used herein, refers to the ratio, described below, relating to the transfer to polymer steps, leading to long chain branches per 1000 C-atoms (or 500 ethylene units) converted in polyethylene. Typically LCBf is the average number of the whole polymer. This ratio can be determined via NMR or be calculated via simulations. The numbers used herein are derived by simulations. The LCBf derived by simulations is the ratio of transfer to polymer reaction $R_{LCB}$ rate and the propagation rate $R_p$, and multiplied the ratio by 500. $R_{LCB}=k_{LCB}*[Rad]*[Pol]$ and $R_p=k_p*[Rad]*[Ethylene]$. The ratio $R_{LCB}/R_p$ only would indicate the frequency of LCB-formation per one ethylene unit converted. To derive the total LCBf of the whole polymer, the ratio has to be integrated over the temperature, pressure and conversion and polymer formation profiles of the used reactor. This is typically done in a simulation software like Predici by CiT or similar programs, which are able to solve differential equations.

The term "short chain branching frequency (SCBf)" used herein, refers to the ratio, described below, relating to the backbiting (or SCB formation) step, leading to short chain branches per 1000 C-atoms (or 500 ethylene units) converted in polyethylene. Typically SCBf is the average number of the whole polymer. This ratio can be determined via NMR or be calculated via simulations. The numbers used herein are derived by simulations. The SCBf derived by simulations is the ratio of backbiting reaction $R_{SCB}$ rate and the propagation rate $R_p$, and multiplied the ratio by 500. $R_{SCB}=k_{SCB}*[Rad]$ and $R_p=k_p*[Rad]*[Ethylene]$. The ratio $R_{SCB}/R_p$ only would indicate the frequency of SCB-formation per one ethylene unit converted. To derive the total SCBf of the whole polymer, the ratio has to be integrated over the temperature, pressure and conversion and polymer formation profiles of the used reactor. This is typically done in a simulation software like Predici by CiT or similar programs, which are able to solve differential equations.

Test Methods

Melt Index—Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Experimental

Description of Flow Diagram

FIG. 1 shows a generalized flow scheme of a simulated high pressure polymerization process containing a tubular reactor. Stream (1) is the fresh ethylene feed flow, which is compressed together with the outlet of the Booster by the Primary to stream (2). Stream (2) is combined with high pressure recycle stream (18), and distributed through line (3) over the suction inlets of the Hyper. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system fresh feed. The CTA fresh feed can, in principle, be freely distributed over the main compression streams fed and/or distributed over the side stream (8) and front stream (9). CTA fresh feed streams (4) and/or (5) can be fed in the inlet(s), interstage(s), outlet(s) of the Hyper, and/or inlet(s) of the reaction zones. The CTA system can consist of single and/or multiple components, and can include varying compositions.

Stream (6) and/or stream (7) depict a potential comonomer feed. The comonomer feed can, in principle, be freely distributed over the main compression streams fed to, and/or distributed over, the side stream (8) and/or front stream (9). Comonomer streams (6) and/or (7) can be fed in the inlet(s), interstage(s), outlet(s) of the Hyper, in individual ethylene feed streams to the reactor, and/or directly into the reaction zones. The discharge temperature of the Hyper is typically in the range from 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

In the Reactor, the polymerization is initiated with the help of a free radical initiation system(s) injected, and/or activated, at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11), which is sent to the LPS for further separation. Ethylene stream (15) is cooled and cleaned in stream (17). Stream (16) is a purge stream to remove impurities and/or inerts.

The polymer separated in LPS is further processed in (12). The ethylene removed (13) in the LPS is fed to the Booster, where, during the compression, condensables such as solvent, lubrication oil, and others components, are collected and removed through stream (14). The outlet of the Booster is combined with make-up ethylene stream (1), and further compressed by the Primary.

Polymerization Simulations

A polymerization simulation model with applied reaction scheme and kinetics is described by Goto et al., as discussed below. Other reactor and product modeling frameworks are available through ASPEN PLUS of Aspen Technology, Inc., Burlington, Mass., USA; and PREDICI of Dr. Wulkow Computing in Technology GmbH (CiT), Rastede, Germany. Process and product responses predicted by these model frameworks are determined by the reactor parameters, the applied reaction scheme, and kinetic parameters. The applied reaction scheme and kinetic parameters are described below.

The polymerization simulations were achieved with Goto's LDPE simulation model as described in the following: S. Goto et al; *Journal of Applied Polymer Science: Applied Polymer Symposium*, 36, 21-40, 1981 (Title: Computer model for commercial high pressure polyethylene reactor based on elementary reaction rates obtained experimentally).

The kinetic data used by Goto et al. was derived from high pressure free radical polyethylene polymerization experiments performed at varying temperature, pressure and polymer concentration as described in the following references: K Yamamoto, M Sugimoto; Rate constant for long chain-chain branch formation in free-radical polymerization of ethylene; *J. Macromol. Science-Chem., A*13 (8), pp. 1067-1080 (1979). The elementary reaction steps are described by Goto et al. as follows: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 1 for kinetic data for main reactions, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as analyzed by C13 NMR technique) in high pressure polyethylene, as a function of pressure and temperature conditions.

TABLE 1

Kinetic Constants for Main Reactions

| Reaction | ko | Ea | $\Delta V$ |
|---|---|---|---|
| Units | m³/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs is given in Table 2. The kinetic constants haven been calculated with the help of the kinetic constants on the Cs-value (ks/kp) as determined by Mortimer (see References below), and the ethylene propagation kinetics as given by Goto et al. (see Table 1).

TABLE 2

Kinetic Constants for Selected CTAs

| | Chain Transfer to Modifier | | | Reactivity Ratios | |
|---|---|---|---|---|---|
| | kao | | | | |
| Component | m3/hr/ kgmol | Ea cal/mol | $\Delta V$ cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |
| Monomeric CTA | 1.41E+12 | 10520 | −19.7 | 0.08 | 12.5 |

REFERENCES

General: G. Luft, *Chem.-Ing.-Tech., Hochdruck-Polyaethylen*, Vol. 51 (1979) Nr. 10, pages 960-969. Peroxide efficiency: T. van der Molen et al, *Ing. Chim. Ital, "Light-off" temperature and consumption of 16 initiators in LDPE production*, Vol. 18, N. 1-2, February 1982, pages 7-15.

Chain transfer activity and comonomer reactivity scheme data are described in the following: P. Ehrlich, G. A. Mortimer, *Fundamentals of the free radical polymerization of ethylene, Adv. Polymer Sci.*, Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.; Vol.* 8, p 1513-1523 (1970); G. Mortimer, Journal of Polymer Science: Part A-1, Chain transfer in ethylene polymerization. Part V. The effect of temperature; Vol. 8, p 1535-1542 (1970); G. Mortimer, Journal of Polymer Science: Part A-1, Chain transfer in ethylene polymerization Part V. The effect of pressure, Vol. 8, p 1543-1548 (1970); and G. Mortimer, Journal of Polymer Science: Part A-1, Chain transfer in ethylene polymerization VII. Very reactive and depleteable transfer agents, Vol. 10, p 163-168 (1972). See LDPE simulation model in S. Goto et al; Journal of Applied Polymer Science: Applied Polymer Symposium, 36, 21-40, 1981 (Title: Computer model for commercial high pressure polyethylene reactor based on elementary reaction rates obtained experimentally. M. Buback et al., Macromol. Chem. Phys. 2007, 208, p. 772-783, Initiator efficiency of tert-alkyl Peroxyesters in High-Pressure Ethene Polymerization, Detail of Tubular Reactor Simulations The polymerizations were simulated for a high pressure tubular reactor operating at an inlet pressure of 265 MPa using an ethylene-based through put of 60 metric tons/hr. The reactor configuration comprises a 1500 m total length (four reaction zones), where the inner tube diameters are varied between 40 mm, for the first reaction zone, and 60 mm for the other reaction zones. The ethylene-based flow coming from the hyper compressor is split by 50/50/0/0 (50% to the front and 50% ethylene to the second reaction zone side) and fed to the reactor. Initiator and CTA are injected into the reactor at different locations, to create multiple reaction zones, thus creating a four peak temperature profile, and elevating the overall conversion. The cooling water temperatures for cooling the reaction zones are operated with an inlet temperature of 180° C. for the first part of the reactor, while the remaining part is operated with a cooling water inlet temperature of 160° C. The simulations have been done with starting temperature (140° C.) and either Propionaldehyde (PA) or propylene (C3=) have been used as Chain Transfer Agent (CTA).

As mentioned in the introduction part, the hyper compressor capacity is normally fixed, and can only be marginally varied. In order to reduce the polymer output, the following patent publication, WO 2010/081685, shows a method, where one or more reaction zones are taken out, while product properties are varying/drifting. In this invention, we propose an alternative for shutting down reaction zones. Surprisingly we have found that product quality can be maintained by lowering operating pressure. The lower operating pressure results in lower peak temperatures, due to initiator efficiency, by which polymer output is reduced. Furthermore the lower operating pressure allows lowering gas density at the suction side of the hyper compressor, by decreasing the pressure and/or temperature conditions, without overloading the compressor system. It is important to note that the lower ethylene density at suction side of the hyper compressor results in a lower ethylene throughput. The influence of pressure and/or temperature on the ethylene density and the hyper throughput is shown in Table 3. The hyper compressor conditions for a baseline simulation (CP1) are based on a suction temperature of 20° C., and a ratio of 10 between the discharge and suction pressures. When changing temperature and/or pressure at the suction side of the compressor, the throughput of the hyper compressor can be calculated, by multiplying the baseline throughput with the ratio of the density after changing the pressure and temperature at the suction side and the suction side density in the baseline. As shown in the Table 3, a hyper throughput reduction of 14% is very well possible, while remaining the same motor and mechanical load at the hyper compressor.

Influence of Reactor Pressure on Initiator Efficiency

Table 1 shows that temperature and pressure have a significant influence, via the activation energy (Ea) and activation volume (ΔV), on propagation rates and radical termination rates. Peroxide efficiency is affected by the ratio $K_p/K_t^{1/2}$, and will therefore increase with higher temperature and/or higher pressure, and will decrease with lower temperature and/or lower pressure. For instance, Theo van der Molen et al. (see above References) show in their article "Light-off temperature and consumption of 16 initiators in LDPE production," that the consumption of initiators, to reach a certain temperature level in a high pressure LDPE reactor, is strongly affected by the operating pressure. Thus lowering operating pressure, without increasing the amount of initiator system, will lead to lower maximum zone or peak temperature(s) and lower monomer conversion level for a given reactor system.

Below equations and boundaries were developed, and validated, to specify the desired operating ranges for the consumption of higher temperature initiation systems in the individual reaction zone(s) or overall reactor system:

Ratio of Highest Temperature Class Initiator System (For Example, a High Temperature Peroxide System) Per Reaction Zone for Different Reactor Inlet Pressures:

$$Q_i = \frac{PO_{P2,i}}{PO_{P1,i}}, \quad \text{(Eqn. A)}$$

where:
PO: Is the consumption of the highest temperature class initiator in moles
POi: Is the consumption of the highest temperature class initiator in moles in reaction zone i
P2: Is the inlet pressure (P$_2$) of an inventive polymerization (in MPa).
P1: Is the inlet pressure in the corresponding comparative polymerization (in MPa)
i: Is the i$^{th}$ reaction zone
N: Is the total number of reaction zones
PO$_{P1}$: Is the consumption of the highest temperature class initiator in moles at the reactor inlet pressure P1.
PO$_{P2}$: Is the consumption of the highest temperature class initiator in moles at the reactor inlet pressure P2.
PO$_{P1,i}$ is the molar amount of the initiators from the highest temperature class used in reaction zone i at reactor inlet pressure P1.
PO$_{P2,i}$ is the molar amount of the initiators from the highest temperature class used in reaction zone i at reactor inlet pressure P2.

$$0.90 * a^{\frac{(P1-P2)}{10MPa}} < Qi < 1.1 * b^{\frac{(P1-P2)}{10MPa}}, \quad \text{(Eqn. B)}$$

The factors 0.9 and 1.1 are used to reflect the normal variability in peroxide consumption per reaction zone.

Where a is preferably equal or larger than 0.96, more preferably equal or larger than 0.97 and most preferably equal or larger than 0.98. In a further embodiment a is less than, or equal to, 1.00.

Where b is preferably equal or less than 1.04, more preferably equal or less than 1.03 and most preferably equal or less than 1.02. In a further embodiment, b is greater than, or equal to, 1.00.

Ratio of Total Reactor Consumption of Highest Temperature Class of Initiator System(s) (For Example, a High Temperature Peroxide Initiator System) (Y) for Reactor Inlet Pressures at Respectively Recipe (P1) Versus Inventive Value (P2) According:

$$Y = \frac{\sum_{i=1}^{N} PO_{P2,i}}{\sum_{i=1}^{N} PO_{P1,i}}. \quad \text{(Eqn. C)}$$

$\sum_{i=1}^{N} PO_{P1,i}$ is the summation over the reactor with n reaction zones of the molar amounts of the initiators from the highest temperature class within a reaction zone at reactor inlet pressure P1.

$\sum_{i=1}^{N} PO_{P2,i}$ is the summation over the reactor with n reaction zones of the molar amounts of the initiators from the highest temperature class within a reaction zone at reactor inlet pressure P2.

$$0.95 * x^{\frac{(P1-P2)}{10MPa}} < Y < 1.04 * z^{\frac{(P1-P2)}{10MPa}}, \quad \text{(Eqn. D)}$$

where x is preferably equal or larger than 0.97, more preferably equal or larger than 0.98 and most preferably equal or larger than 0.99. In a further embodiment x is less than, or equal to, 1.00.

Here, z is preferably equal or less than 1.03, more preferably equal or less than 1.02 and most preferably equal or less than 1.01. In a further embodiment z is greater than, or equal to, 1.00.

Comparative Polymerizations for Tubular Reactor

All simulations are reported in Table 4B, in which CP1 reflects the baseline. The initiator flows for each reaction zone of each example have been normalized to 100% for baseline CP1. For CP2, 3 and 4, the PO flows were adjusted to keep the same peak temps. In CP3 and CP4, some of the PO flows were taken out. The CP1 (baseline) shows feeding and controlling initiator flows to all four reaction zones, while maintaining peak temperatures of 302° C. A person skilled in the art is able to select suitable initiator types and mixtures to operate at these temperature settings. Suitable initiator types and mixtures are mentioned in WO2010/081685A1. CP1.1 and CP1.2 show the impact of respectively lowering and increasing by 10% the amounts of initiator systems injected in each reaction zone. The selection of initiator type and mixtures is important for reaching certain peak temperature ranges, but is not relevant for the invention. The CP2 shows the same reactor operating conditions as in CP1, except for higher cooling water temperatures (195° C.) used. CP3 and CP4 reflect the inventive cases of WO 2010/081685 A1 by feeding initiator to respectively one and two reaction zones have been stopped, while the remaining peak temperatures, the boiling water temperatures, as well as the product MI (1MI) have been kept the same as in CP1, by adjusting all other feed flows, except of the hyper compressor throughput.

In the CP5 to 6, all conditions have been maintained, except for initiator flows and the product melt-index (10 and 0.25 g/10 min respectively), which were adapted through the CTA (PA) flow. CP7 was simulated for "MI of 1" using propylene as the CTA agent. The comonomer activity of propylene results in additional methyl SCB formation, which will lower product density.

Comparative Simulation for Autoclave-Tubular Reactor System

Simulation (CP8) has been carried out for an autoclave-tubular reactor system with internal dimensions of 250 mm and L/D=3 for the autoclave reactor, while the tubular reactor has an internal diameter of 20 mm and a length of 320 m. The autoclave reactor comprises a stirrer, and is divided by a baffle in a top and a bottom reaction zones. In both reaction zones, ethylene, initiator and CTA are injected. The autoclave outlet is fed to the 320 m length of a tubular reactor (inside tube diameter of 20 mm), wherein the reaction is twice reactivated by injection of initiator. The simulation is done for a reactor inlet pressure of 2000 Bar and two ethylene feed streams of 2,000 kg/hr. The simulation study only uses Propionaldehyde (PA) as a CTA.

Inventive Polymerization

All examples (IP1 to 10) represent the simulated results of this invention. IP1 to 3 have been simulated, while the initiator and CTA flow rates are maintained of CP1, except for the reactor inlet pressure, which is reduced by 200, 400 and 600 Bar, respectively. The peak temperatures are decreased, due to the impact of lower reactor inlet pressure on the ethylene propagation rate. In the IP4, the inlet pressure and the hyper throughput are reduced by respectively 600 Bar and 14%. IP5 is simulated for the same conditions as IP4, except that the CTA concentration is adjusted to reach 1MI.

New 1 to 3 (inventive) show variations in initiation systems compared to IP5, while remaining product quality targets. New 4 and 5 (comparative) show variations in initiation systems, compared to IP5, while exceeding product quality targets.

Table 3 shows the influence of suction temperature and pressure on the density of ethylene. The ratio between the discharge and suction pressures is kept at 10. The data have been obtained from ASPEN and PC SAFT computation (both available from ASPEN PLUS).

TABLE 3

Influence of Suction Temperature and Pressure on the Density of Ethylene.

| Discharge pressure Bar | Suction pressure Bar | Suction temperature ° C. | Density kg/m³ | Through-put reduction % | Note |
|---|---|---|---|---|---|
| 2650 | 265 | 20 | 426.5 | 0 | Tubular "baseline" |
| 2050 | 205 | 20 | 407.1 | 4.7 | Tubular |
| 2050 | 205 | 28 | 391.5 | 8.9 | Tubular |
| 2050 | 205 | 37 | 373.9 | 14.1 | Tubular |
| 2000 | 200 | 20 | 404.9 | 5.3 | Autoclave-Tube |
| 1600 | 160 | 37 | 355.5 | 17 | Autoclave-Tube |

Table 4A shows simulation conditions for a combined autoclave-tubular reactor system. Table 4B shows the simulation conditions for the tubular reactor. Table 5 shows the high temperature peroxide ratio for total reaction zone (Y) and each reaction zone (Qi) using the equations discussed above.

TABLE 4A*

(Autoclave-Tube combination)

| Example | Inlet Pressure Bar | Peak polymerization temp ° C. | CTA Mol ppm | Hyper throughput % |
|---|---|---|---|---|
| CP8 (Comparative AC/T) | 2000 ($P_1$) | 250/300/300 | 557 | 100 |
| IP9 (Inventive to CP8 - Claim 2) | 1600 ($P_2$) | 226/282/287 | 561 | 100 |
| IP10 (Inventive to CP8 - Claim 1) | 1600 ($P_2$) | 227/280/286 | 553 | 86 |

*For each polymerization, for each reaction zone in the autoclave reactor (two reaction zones 1 and 2), a class 1 (tert-butyl peroxy-2-ethyl hexanoate) initiator system was used. For each reaction zone in the tubular reactor (reaction zones 3 and 4), a mixture of class 1 and class 3 initiator systems were used. For each zone 3 and zone 4, 40 wt % of class 1 (tert-butyl peroxy-2-ethyl hexanoate) initiator system, and 60 wt % of class 3 (di-tert-butyl peroxide) initiator system were used. Each wt % represents the weight percent of the initiator, based on the total weight of the two initiators used in each of the tubular reaction zones.

TABLE 4B*

(Tubular Reactor)

| Example | Inlet Pressure Bar | Maximum Temperature for each reaction zone ° C. | CTA Mol ppm | Hyper throughput = Net reactor feed % | Boiling water ° C. |
|---|---|---|---|---|---|
| CP1 (Comparative baseline) | 2650 ($P_1$) | 302/302/302/302 | 1085 | 100 | 180/160 |
| CP1.1 (Comparative baseline) | 2650 ($P_1$) | 299/299/300/300 | 1085 | 100 | 180/160 |
| CP1.2 (Comparative baseline) | 2650 ($P_1$) | 304/303/304/304 | 1085 | 100 | 180/160 |
| CP2 (Comparative baseline) | 2650 ($P_1$) | 302/302/302/302 | 1085 | 100 | 195/195 |
| CP3 (Comparative WO2010/081685) | 2650 ($P_1$) | NA/302/302/302 | 1085 | 100 | 180/160 |
| CP4 (Comparative WO2010/081685) | 2650 ($P_1$) | NA/302/302/NA | 1085 | 100 | 180/160 |
| IP1 (Claim 2) The comparative is CP1 | 2450 ($P_2$) | 294/293/294/294 | 1085 | 100 | 180/160 |
| IP2 (Claim 2) The comparative is CP1 | 2250 ($P_2$) | 286/286/287/287 | 1085 | 100 | 180/160 |
| IP3 (Claim 2) The comparative is CP1 | 2050 ($P_2$) | 279/279/281/280 | 1085 | 100 | 180/160 |
| IP4 (Claim 1) The comparative CP1 | 2050 ($P_2$) | 283/284/284/284 | 1085 | 86 | 180/160 |
| IP5 (Claim 1) The comparative is CP1 | 2050 ($P_2$) | 283/284/284/285 | 1102 | 86 | 180/160 |
| IP5.1 | 2050 ($P_2$) | 283/284/276/283 | 1085 | 86 | 180/160 |
| IP5.2 | 2050 ($P_2$) | 283/290/284/284 | 1085 | 86 | 180/160 |
| IP5.3 | 2050 ($P_2$) | 283/273/289/285 | 1085 | 86 | 180/160 |
| IP5.4 (comparative to IP5) | 2050 ($P_2$) | 276/277/279/279 | 1085 | 86 | 180/160 |
| IP5.5 (comparative to IP5) | 2050 ($P_2$) | 289/288/288/288 | 1085 | 86 | 180/160 |
| CP5 (Comparative 10 MI) | 2650 ($P_1$) | 302/302/302/302 | 1841 | 100 | 180/160 |
| IP6 (Inventive to CP5 - | 2050 ($P_2$) | 283/284/284/284 | 1841 | 86 | 180/160 |
| CP6 (Comparative 0.25 MI) | 2650 ($P_1$) | 302/302/302/302 | 765 | 100 | 180/160 |
| IP7 (Inventive to CP6 - Claim 1) | 2050 ($P_2$) | 283/284/284/284 | 765 | 86 | 180/160 |
| CP7 (Comparative C3) | 2650 ($P_1$) | 302/302/302/302 | 8675 | 100 | 180/160 |
| IP8 (Inventive to CP7 - Claim 1) | 2050 ($P_2$) | 283/284/284/284 | 8675 | 86 | 180/160 |

*For each polymerization, mixtures of class 1 and class 3 initiator systems were used in each reactor zone. For each zone 1 and zone 2, 80 wt % of class 1 (tert-butyl peroxy-2-ethyl hexanoate; half-life temperature of 113° C., at 0.1 hr) initiator system, and 20 wt % of class 3 (di-tert-butyl peroxide; half-life temperature of 164° C., at 0.1 hr) initiator system were used. For zone 3 and zone 4, 30 wt % class 1 (tert-butyl peroxy-2-ethyl hexanoate) initiator system, and 70 wt % of class 3 (di-tert-butyl peroxide) initiator system were used. Each wt % represents the weight percent of the initiator, based on the total weight of the two initiators used in each of the reaction zones.

TABLE 5*

Peroxide Ratios

| Example | Y Total | Q1 Peak 1 | Q2 Peak 2 | Q3 Peak 3 | Q4 Peak 4 | $0.95 *_X \frac{(P1-P2)}{10\,MPa}$ | $1.04 *_Z \frac{(P1-P2)}{10\,MPa}$ |
|---|---|---|---|---|---|---|---|
| CP1 (Comparative baseline) | 1.0 | 1.0 | 1.0 | 1.0 | 1.0 | 0.95 | 1.04 |
| CP1.1 (Comparative baseline) | 0.9 | 0.9 | 0.9 | 0.9 | 0.9 | 0.95 | 1.04 |
| CP1.2 (Comparative baseline) | 1.1 | 1.1 | 1.1 | 1.1 | 1.1 | 0.95 | 1.04 |
| CP2 (Comparative baseline) | 0.78 | 0 | 0.96 | 0.73 | 1 | 0.95 | 1.04 |
| CP3 (Comparative WO2010/081685) | 0.46 | 0 | 0.96 | 0.73 | 0 | 0.95 | 1.04 |

TABLE 5*-continued

| | | | Peroxide Ratios | | | | |
|---|---|---|---|---|---|---|---|
| | Y | Q1 | Q2 | Q3 | Q4 | 0.95 | 1.04 |
| Example | Total | Peak 1 | Peak 2 | Peak 3 | Peak 4 | $*x \frac{(P1-P2)}{10\,MPa}$ | $*z \frac{(P1-P2)}{10\,MPa}$ |
| CP4 (Comparative WO2010/081685) | 0.68 | 0.93 | 0.93 | 0.47 | 0.53 | 0.95 | 1.04 |
| IP1 (Claim 2) The comparative is CP1 | 1.0 | 1.0 | 1.0 | 1.0 | 1.0 | 0.91 | 1.09 |
| IP2 (Claim 2) The comparative is CP1 | 1.0 | 1.0 | 1.0 | 1.0 | 1.0 | 0.86 | 1.16 |
| IP3 (Claim 2) The comparative is CP1 | 1.0 | 1.0 | 1.0 | 1.0 | 1.0 | 0.81 | 1.23 |
| IP4 (Claim 1) The comparative is CP1 | 1.0 | 1.0 | 1.0 | 1.0 | 1.0 | 0.81 | 1.23 |
| IP5 (Claim 1) The comparative is CP1 | 1.0 | 1.0 | 1.0 | 1.0 | 1.0 | 0.81 | 1.23 |
| IP5.1 | 0.9 | 1.0 | 1.0 | 0.6 | 1.0 | 0.81 | 1.23 |
| IP5.2 | 1.11 | 1.0 | 1.4 | 1.0 | 1.0 | 0.81 | 1.23 |
| IP5.3 | 0.99 | 1.0 | 0.6 | 1.4 | 1.0 | 0.81 | 1.23 |
| IP5.4 (comparative to IP5)** | 0.7 | 0.7 | 0.7 | 0.7 | 0.7 | 0.81 | 1.23 |
| IP5.5 (comparative to IP5)*** | 1.3 | 1.3 | 1.3 | 1.3 | 1.3 | 0.81 | 1.23 |
| CP5 (Comparative 10 MI) | 1.0 | 1.0 | 1.0 | 1.0 | 1.0 | 0.95 | 1.04 |
| IP6 (Inventive to CP5) | 0.97 | 1.0 | 1.0 | 1.0 | 0.92 | 0.81 | 1.23 |
| CP6 (Comparative 0.25 MI) | 1.0 | 1.0 | 1.0 | 1.0 | 1.0 | 0.95 | 1.04 |
| IP7 (Inventive to CP6 - Claim 1) | 1.08 | 1.0 | 1.0 | 1.0 | 1.17 | 0.81 | 1.23 |
| CP7 (Comparative C3) | 1.0 | 1.0 | 1.0 | 1.0 | 1.0 | 0.95 | 1.04 |
| IP8 (Inventive to CP7 - Claim 1) | 1.06 | 1.03 | 0.97 | 1.07 | 1.0 | 0.81 | 1.23 |

*For the Comparative Examples, P1 = P2.
**Example, IP5.4 does not satisfy Equation D, because of a very low amount of the highest temperature initiator system.
***Example IP5.5 does not satisfy Equation D, because of the very high amount of the highest temperature initiator system.

Product Quality Targets and Control:

The following parameters have been simulated to reflect product properties, namely melt-index, LCB and SCB levels. Melt-index reflects the average molecular weight, and can be adjusted/controlled through varying the level and contribution of CTA systems. In most simulated and comparative examples, the predicted melt-index and number molecular weights (Mn's) are shown, without adjusting the CTA level, in order to control the melt-index at target. The impact of the changing process conditions on the polymer properties (e.g., LCB level and SCB level) increases from CP1 to CP4, is moderate for CP2, and is drastic for CP3 and CP4, while the impact is minimal for IP 1 to IP 5.

The SCB level is an indicator for product density, and the density is allowed to vary in certain ranges, for instance 0.922±0.002 g/cc. The LCB level heavily impacts the molecular weight distribution, and consequently the rheological properties, for instance, melt strength, which is important in applications, such as blown film and cast film, foam, and extrusion coating. Therefore, in general, only small variations (for instance ±5% versus a comparative product) in LCB level are allowed for the production of "in specification" or prime material. Larger deviations will result in product with strongly deviating performance in polymer properties for applications, such as blown film or cast film. For example, the optical appearance (for instance significant changes in gloss and/or haze) would be out-of-spec, and therefore, the polymer product would be classified as "off-specification" or "off-grade" material.

Comparative Polymerizations 1-4 and Inventive Polymerizations 1-5

Table 6 summarizes the predicted conversion and properties of polymer, in terms of Long Chain Branching (LCBf), Short Chain Branching (SCBf) and number average molecular weight (Mn). The polymer output reduction, or the turn down ratio, is defined by the ratio between the polymer output of each case and the polymer output of the "baseline" case (CP1). In CP2, the polymer output is reduced by increasing the cooling water temperature. The results show that the impact of increasing cooling water temperature on polymer output is reduced by 4.1%, while the LCB level is reduced by 10%.

Figure 2:
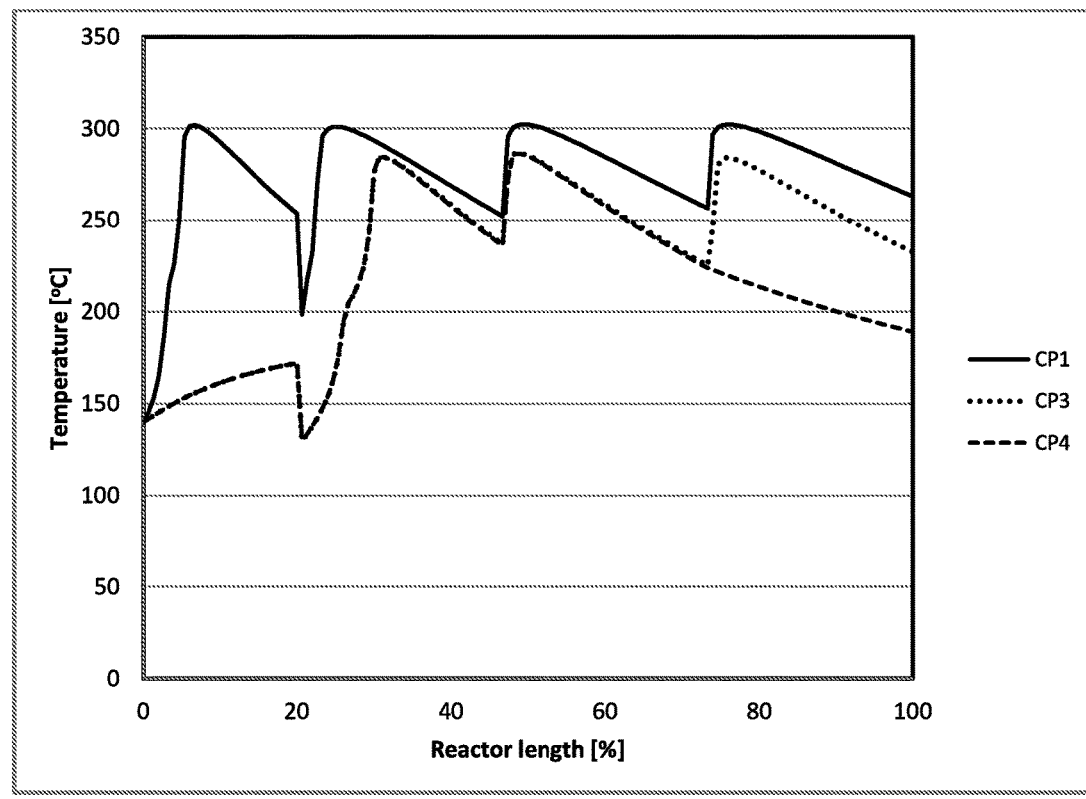
FIG. 2 depicts the "reactor temperature versus reactor length" profiles for three comparative polymerizations, CP1, CP3 and CP4.

As can be seen, by stopping the injection of initiator systems to one or two reaction zones, the ethylene conversions are reduced to 27% and 20.8%, respectively, for CP3 and CP4, indicating much less polymer is produced, thus lowering the turn down ratio to 86.4% (CP3) and 66.8% (CP4), respectively. The reactor temperature profiles for these cases are shown in FIG. 2. However, the simulated polymer properties show much lower LCB and SCB levels. One skilled in the art knows that the LCB level will strongly affect MWD and the rheological properties of the produced polymer. This indicates that CP3 and CP4 have MWD and rheology properties strongly deviating from the baseline CP1, and thus are considered as off-grade products.

In contrast to the polymerizations disclosed in WO2010/081685, the simulation results obtained from the inventive polymerizations (IP1 to IP5), show that by reducing the reactor inlet pressure, it is possible to reduce the polymer output, and consequently, the turn down ratio (see IP1 to IP3). The inventive processes use lower polymer output, by reducing the efficiencies of the applied initiator systems, while balancing polymer properties, by combining opposite impacts, for instance lowering of peak temperatures generally reduces LCBf and narrows MWD, however operating at lower pressure level increases LCBf and broadens MWD. A similar trend is observed for Mn values and SCB levels.

In the more optimal cases, like IP4 and IP5, both the reactor pressure and the hyper throughput have been reduced, by respectively, 600 Bar and 14%, which results in a reduction of 20% in polymer output, by reducing throughput and lowering the ethylene conversion level to 28.9% (compared to 31.2% in CP1). Both IP4 and IP5 show greater reduction in the polymer output, while surprisingly the main polymer parameters, such as LCB and SCB levels are maintained at the desired levels.

Figure 3:
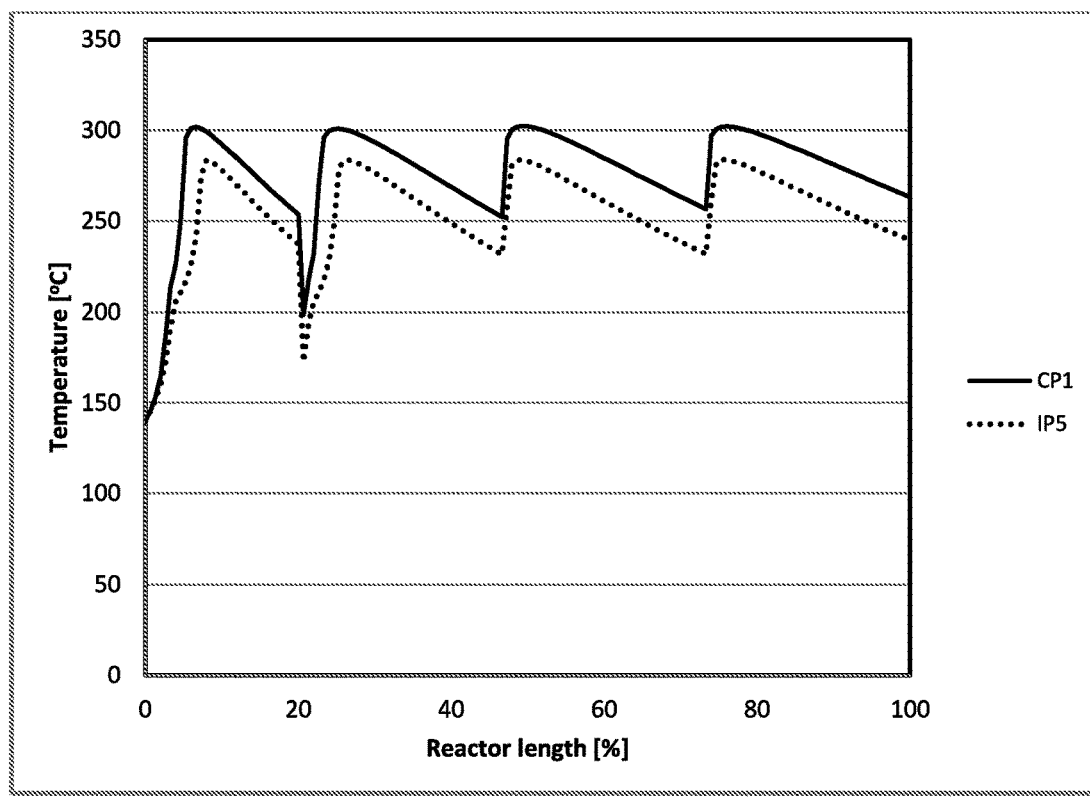
FIG. 3 depicts the "reactor temperature versus reactor length" profiles for one comparative polymerization, CP1, and one inventive polymerization, IP5.
Figure 4:
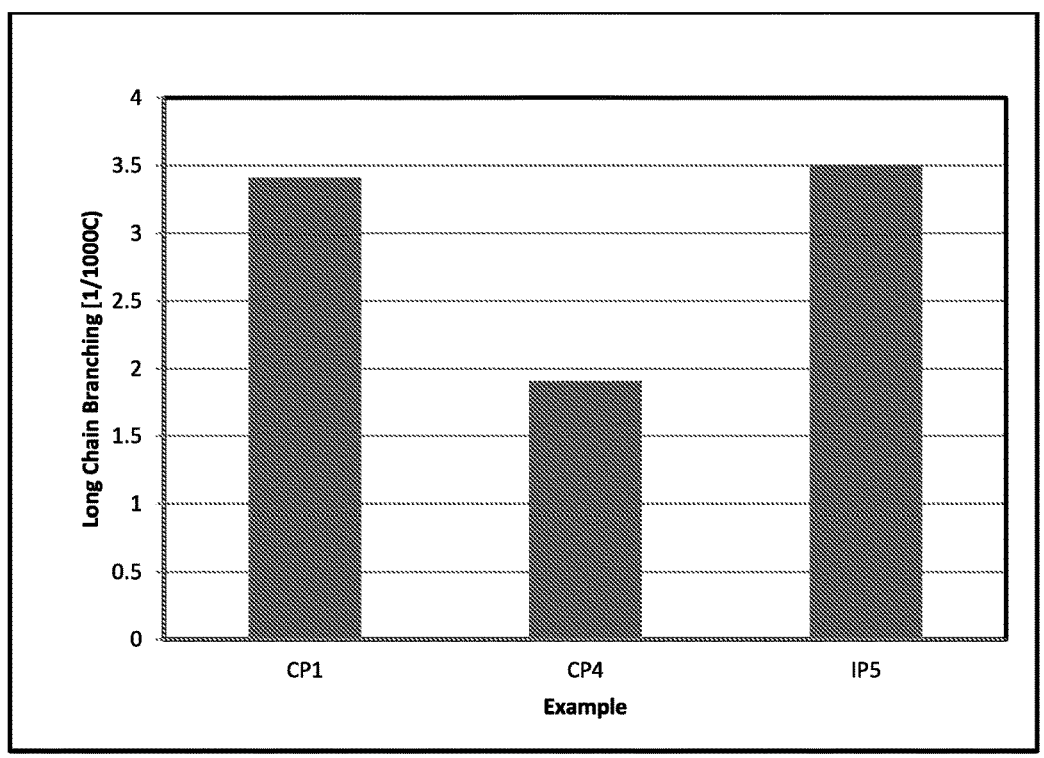
FIG. 4 shows the Long Chain Branching (LCBf) levels for polymers prepared from two comparative polymerizations (CP1, CP4) and one inventive polymerization (IP5).

The temperature profiles for CP1 and IP5 are shown in FIG. 3. It can be seen that the peak temperature of the IP5 is lower than the comparative case (CP1), due to the reduction of pressure and hyper throughput. In FIG. 4, the LCB level of polymer of the CP1 and the two extreme cases of CP4 and IP5 are shown. Interestingly, in all the inventive simulations, the polymer properties are remained, while significantly different values in SCBf and LCBf are observed in CP3 and CP4. This indicates, that in the inventive polymerizations, is much easier to avoid off-grade production, while significant output reduction can be achieved.

Furthermore, the inventive polymerizations allows significant output reductions and maintaining polymer properties, while varying the distributions and/or consumption of the higher class initiator within the proposed boundaries of Equation D. These advantages as shown in examples "IP5.1 to IP5.5," and are beyond the advantages achieved by conventional variability in process stability and/or initiation system usage as shown in CP1.1 and CP1.2.

Comparative Polymerizations 5-6 and Inventive Polymerizations 6 and 7

The influence of MI (melt index) on the turn down ratio has been investigated for the melt index of 10 g/10 min and 0.25 g/10 min, which data is presented in Table 5 (CP5 and IP6 for 10MI, CP6 and IP7 for 0.25 MI). Similar to the "1MI product," the polymer output was reduced by 20%. Surprisingly, it was found that in all the "MI cases," the polymer output was reduced by 20%, resulting in an overall turn down ratio of about 80%. This indicates that the turn down ratio is independent for a wide range of MI, and the results for the more extensive "1MI" cases can be extrapolated to lower and higher melt-indices.

Comparative Polymerizations 7 and Inventive Polymerizations 8

Propylene was simulated as CTA, in order to study the impact of different CTAs and/or monomeric CTAs on the turn down ratio, see CP7 and IP8. Propylene, being a monomeric CTA, has dual functionality, by which it can react as monomer, forming methyl branches in the polymer, and as a chain transfer agent, forming vinyl unsaturation and starting new molecules. Due to differences in chain transfer activity and kinetic parameters between PA and propylene, a much higher concentration of propylene is required to reach the desired MI (see CP1 and IP5, CP7 and IP8 in Table 5). Also for a monomeric CTA, as propylene, the inventive simulation IP10 leads to similar product properties and a significantly reduced polymer output versus the comparative simulation CP7.

Inventive Polymerization in Autoclave-Tube Reactor (CP8 and IP9-10)

The influence of an autoclave based configuration on the turn down ratio and polymer properties has been investigated in CP8, IP9 and IP10. The examples are for an autoclave based system, consisting of two autoclave zones, followed by two tubular reaction zones. The simulations have been done for a product with a melt index of "2 g/10 min." In the inventive polymerizations, the level of LCBf is increased by 9% and 7%, respectively. These increases are slightly higher than the acceptable variation (5%); however these levels can be easily and quickly adjusted by lowering the injected amounts of the initiation systems within the boundaries of Equation D.

Surprisingly, it has been found that reducing the reactor inlet pressure, with optional lowering of the suction pressure of the hyper or the secondary compressor system, is an effective way to reduce the polymer output of a high-pressure, free-radical reactor system for the polymerization of an ethylene-based polymer, while maintaining the desired product qualities. The polymer output reduction, or turn down ratio, is a function of the reduction of the pressure level(s). Surprisingly, this effect has been observed for both tubular and autoclave-based reactors. The polymer reduction potential was found not to be affected by product melt-index or by the presence or absence of monomeric functionality in the CTA. The inventive operation leads unexpectedly only to small changes in melt index and LCB level. These changes can be easily compensated by minor adjustments in CTA level, reactor zone temperatures and/or and peak zone temperatures. Importantly, equations and boundaries were derived to specify the desired operating ranges for the consumption of initiator system of the highest temperature class in the individual reaction zone(s) or in the overall reactor system. Table 6 below lists the conversion levels, turn down ratio, and the overall polymer properties for the comparative and inventive polymerizations of this study.

TABLE 6

Predicted conversions levels and properties of overall polymer

| Example | Conversion % | LCBf (1/1000 C.) | SCBf (1/1000 C.) | Mn g/mole | Melt Index (I2) g/10 min | Turn down ratio % |
| --- | --- | --- | --- | --- | --- | --- |
| CP1 | 31.2 | 3.41 | 23.7 | 20272 | 1 | 100 |
| CP2 | 28.3 | 3.07 | 23.5 | 20485 | 0.89 | 95.9 |
| CP3 | 27 | 2.75 | 22.9 | 20972 | 0.69 | 86.4 |
| CP4 | 20.8 | 1.91 | 21.4 | 22408 | 0.33 | 66.8 |
| IP1 | 29.6 | 3.31 | 23.9 | 20580 | 0.85 | 94.8 |
| IP2 | 28.2 | 3.27 | 24.3 | 20692 | 0.8 | 90.5 |
| IP3 | 27 | 3.28 | 24.8 | 20636 | 0.82 | 86.4 |
| IP4 | 28.9 | 3.50 | 24.9 | 20384 | 0.93 | 79.5 |
| IP5 | 28.9 | 3.50 | 24.9 | 20272 | 1 | 79.8 |

TABLE 6-continued

Predicted conversions levels and properties of overall polymer

| Example | Conversion % | LCBf (1/1000 C.) | SCBf (1/1000 C.) | Mn g/mole | Melt Index (I2) g/10 min | Turn down ratio % |
|---|---|---|---|---|---|---|
| IP5.1 | 28.5 | 3.39 | 24.6 | 20608 | 0.83 | 78.6 |
| IP5.2 | 29.3 | 3.59 | 25.03 | 20123 | 1.07 | 80.9 |
| IP5.3 | 28.6 | 3.46 | 24.77 | 20571 | 0.85 | 78.7 |
| IP5.4 (comparative to IP5) | 27.5 | 3.17 | 24.28 | 21133 | 0.63 | 75.7 |
| IP5.5 (comparative to IP5) | 30 | 3.77 | 25.29 | 19840 | 1.24 | 82.6 |
| CP5 | 33 | 3.59 | 23.9 | 15792 | 10 | 100 |
| IP6 | 30.3 | 3.70 | 25.1 | 15378 | 12.38 | 79.0 |
| CP6 | 30.1 | 3.31 | 23.6 | 22932 | 0.25 | 100 |
| IP7 | 28.1 | 3.44 | 24.9 | 23477 | 0.19 | 80.3 |
| CP7 | 31.1 | 3.44 | 27.6 | 20244 | 1 | 100 |
| IP8 | 28.7 | 3.53 | 29.6 | 22133 | 0.47 | 78.4 |
| CP8 | 33.9 | 4.61 | 27.2 | 18900 | 2 | 100 |
| IP9 | 33.3 | 5.04 | 27.5 | 18901 | 2.01 | 97.7 |
| IP10 | 33.1 | 4.93 | 27.7 | 18847 | 2.04 | 79.6 |

The invention claimed is:

1. A process to prepare an ethylene-based polymer, said process comprising polymerizing ethylene in the presence of at least one initiator system selected from the following: a) class 1 initiator system, b) class 2 initiator system, c) class 3 initiator system, or d) a combination thereof; and at an inlet pressure ($P_2$) greater than, or equal to, 1000 Bar (100 MPa); and in a reactor system comprising at least one hyper compressor and a reactor configuration comprising at least one reactor, which comprises at least one reaction zone; and wherein the inlet pressure ($P_2$) is reduced by at least 200 Bar, as compared to a similar polymerization, in the same reactor system, except it (similar polymerization) is operated at a higher inlet pressure ($P_i$), and at a different hyper compressor throughput, and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P1-P2)}{10MPa}} < Y < 1.04 * z^{\frac{(P1-P2)}{10MPa}}, \quad (\text{Eqn. D})$$

wherein x is greater than, or equal to, 0.97; and wherein z is less than, or equal to, 1.03.

2. A process to prepare an ethylene-based polymer, said process comprising polymerizing ethylene in the presence of at least one initiator system selected from the following: a) a class 1 initiator system, b) a class 2 initiator system, c) a class 3 initiator system, or d) a combination thereof; and at an inlet pressure ($P_2$) greater than, or equal to, 1000 Bar (100 MPa); and in a reactor system comprising a reactor configuration comprising at least one reactor, which comprises at least one reaction zone; and wherein the inlet pressure ($P_2$) is reduced by at least 200 Bar, as compared to a similar polymerization, in the same reactor configuration, except it is operated at a higher inlet pressure ($P_1$), and at a different maximum temperature for at least one reaction zone, and optionally, at a different amount of CTA system fed to the reactor configuration; and wherein, for the process, the "Ratio of total reactor consumption of the highest temperature class initiator system(s) (Y)" meets the following Equation D:

$$0.95 * x^{\frac{(P1-P2)}{10MPa}} < Y < 1.04 * z^{\frac{(P1-P2)}{10MPa}}, \quad (\text{Eqn. D})$$

wherein x is greater than, or equal to, 0.97; and wherein z is less than, or equal to, 1.03.

3. The process of claim 1, wherein the "Ratio of highest temperature initiator system per reaction zone (Qi)" meets the following Equation B:

$$0.90 * a^{\frac{(P1-P2)}{10MPa}} < Qi < 1.1 * b^{\frac{(P1-P2)}{10MPa}}, \quad (\text{Eqn. B})$$

wherein a is greater than, or equal to, 0.96, and b is less than, or equal to, 1.04.

4. The process of claim 1, wherein the reactor configuration comprises at least one tubular reactor, at least one autoclave reactor, a tubular reactor followed by an autoclave reactor, or an autoclave reactor followed by a tubular reactor.

5. The process of claim 1, wherein the ethylene-based polymer is an LDPE.

6. The process of claim 1, wherein the hyper compressor inlet pressure is reduced by greater than 50 Bar (5 MPa), as compared to the hyper compressor inlet pressure of the similar polymerization.

7. The process of claim 1, wherein the hyper compressor inlet pressure is reduced by greater than 100 Bar (10 MPa), as compared to the hyper compressor inlet of the similar polymerization.

8. The process of claim 1, wherein the inlet pressure ($P_1$) is greater than, or equal to, 1100 Bar (110 MPa).

9. The process of claim 1, wherein inlet pressure ($P_1$) is greater than, or equal to, 1200 Bar (120 MPa).

10. The process of claim 1, wherein the at least one initiator system comprises a peroxide.

11. The process of claim 1, wherein the at least one initiator system comprises an initiator selected from the following: tert-butyl peroxypivalate, tert-butyl peroxy-2-ethylhexanoate, tert-butyl peroxyacetate, di-tert-amyl peroxide, 2,5-dimethyl-2,5-di(tert-butylperoxyl)hexane, tert-butyl cumyl peroxide, di-tert-butyl peroxide, or 2,5-Dimethyl-2,5-di(tert-butylperoxy)hexyne-3.

12. The process of claim 3, wherein for Equation B, the value a is less than, or equal to, 1.00, and the value b is greater than, or equal to, 1.00.

13. The process of claim 1, wherein for Equation D, the value x is less than, or equal to, 1.00, and the value z is greater than, or equal to, 1.00.

14. The process of claim 1, wherein the total ethylene based feed flow to the reactor configuration is from 40 to 400 tons per hr.

15. The process of claim 1, wherein the maximum polymer production is from 10 to 100 tons per hr.

* * * * *